United States Patent
Kobayashi et al.

(10) Patent No.: US 9,208,957 B2
(45) Date of Patent: Dec. 8, 2015

(54) ELECTRIC STORAGE CELL AND ELECTRIC STORAGE APPARATUS

(75) Inventors: Shigemi Kobayashi, Higashimatsuyama (JP); Kunihiko Hikiri, Gyoda (JP); Masayuki Nakane, Tsurugashima (JP)

(73) Assignee: UD TRUCKS CORPORATION, Saitama (JP)

( * ) Notice: Subject to any disclaimer, the term of this patent is extended or adjusted under 35 U.S.C. 154(b) by 233 days.

(21) Appl. No.: 13/993,493

(22) PCT Filed: Nov. 28, 2011

(86) PCT No.: PCT/JP2011/077396
§ 371 (c)(1),
(2), (4) Date: Jun. 12, 2013

(87) PCT Pub. No.: WO2012/081384
PCT Pub. Date: Jun. 21, 2012

(65) Prior Publication Data
US 2013/0266828 A1    Oct. 10, 2013

(30) Foreign Application Priority Data

Dec. 13, 2010    (JP) .................................. 2010-276701

(51) Int. Cl.
*H02J 7/00* (2006.01)
*H01G 11/08* (2013.01)
(Continued)

(52) U.S. Cl.
CPC .............. *H01G 11/08* (2013.01); *B60L 3/0046* (2013.01); *B60L 3/0069* (2013.01); *B60L 3/04* (2013.01);
(Continued)

(58) Field of Classification Search
CPC ............ Y02T 10/7005; Y02T 10/7022; Y02T 10/7044; Y02T 10/705; Y02T 90/121; Y02T 90/122; Y02T 90/14; B60L 11/005; B60L 11/182; B60L 11/1861; B60L 11/1879; B60L 3/0046; H01G 11/02; H01G 11/78; H01M 10/425; H01M 10/46; H01M 2/30; H02J 5/005; H02J 7/025; Y02E 60/13
USPC ........................................................ 320/108
See application file for complete search history.

(56) References Cited

U.S. PATENT DOCUMENTS 6,743,546 B1    6/2004  Kaneda et al.
2006/0009251 A1*  1/2006  Noda et al. .................. 455/550.1
(Continued)

FOREIGN PATENT DOCUMENTS

CN    100380710 C    4/2008
JP    2-126574 A    5/1990
(Continued)

OTHER PUBLICATIONS

Office Action mailed Nov. 26, 2014, corresponding to Chinese patent application No. 201180059626.4.
(Continued)

*Primary Examiner* — Vuthe Siek
(74) *Attorney, Agent, or Firm* — Hauptman Ham, LLP

(57) ABSTRACT

An electric storage cell includes a casing configured to house an electric storage element and electrolyte, a charging reception antenna connected to the electric storage element and configured to receive electric power transmitted from a power feeding unit in a contactless manner, and a discharging transmission antenna connected to the electric storage element and configured to transmit electric power stored in the electric storage element in a contactless manner. The charging reception antenna and the discharging transmission antenna are arranged in the casing.

28 Claims, 13 Drawing Sheets

(51) Int. Cl.

| | | |
|---|---|---|
| *B60L 11/18* | (2006.01) | |
| *H01G 11/74* | (2013.01) | |
| *H01G 11/78* | (2013.01) | |
| *H01M 2/30* | (2006.01) | |
| *H01M 10/42* | (2006.01) | |
| *H01M 10/46* | (2006.01) | |
| *B60L 3/00* | (2006.01) | |
| *B60L 3/04* | (2006.01) | |
| *B60L 7/12* | (2006.01) | |
| *B60L 11/00* | (2006.01) | |
| *H02J 5/00* | (2006.01) | |
| *H02J 7/02* | (2006.01) | |

(52) U.S. Cl.
CPC ............... *B60L 7/12* (2013.01); *B60L 11/005* (2013.01); *B60L 11/182* (2013.01); *B60L 11/1805* (2013.01); *B60L 11/1824* (2013.01); *B60L 11/1833* (2013.01); *B60L 11/1861* (2013.01); *B60L 11/1879* (2013.01); *H01G 11/74* (2013.01); *H01G 11/78* (2013.01); *H01M 2/30* (2013.01); *H01M 10/425* (2013.01); *H01M 10/46* (2013.01); *B60L 2210/30* (2013.01); *B60L 2210/40* (2013.01); *H02J 5/005* (2013.01); *H02J 7/025* (2013.01); *Y02E 60/13* (2013.01); *Y02T 10/705* (2013.01); *Y02T 10/7005* (2013.01); *Y02T 10/7022* (2013.01); *Y02T 10/7044* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | | |
|---|---|---|---|
| 2007/0117017 A1* | 5/2007 | Sugiyama et al. | ........ 429/231.95 |
| 2009/0308933 A1* | 12/2009 | Osada | ........................ 235/492 |

FOREIGN PATENT DOCUMENTS

| | | |
|---|---|---|
| JP | 2005-073350 A | 3/2005 |
| JP | 2010-193657 A | 9/2010 |

OTHER PUBLICATIONS

International Search Report and Written Opinion mailed Feb. 21, 2012 in International Application No. PCT/JP2011/077396.

\* cited by examiner

ELECTRIC STORAGE CELL AND ELECTRIC STORAGE APPARATUS

RELATED APPLICATIONS

The present application is a National Phase of International Application Number PCT/JP2011/077396, filed Nov. 28, 2011, and claims priority from Japanese Application Number 2010-276701 Dec. 13, 2010.

TECHNICAL FIELD

This invention relates to a chargeable/dischargeable electric storage cell and an electric storage apparatus having the electric storage cell.

BACKGROUND ART

In an electric storage cell in related art, an electric storage element having an electricity-storing functionality is housed in a casing and is hermetically sealed in a fluid-tight/air-tight manner along with electrolyte. Since the electric storage element is charged/discharged using an electrode terminal penetrating the casing, it is necessary to cause the electrode terminal to penetrate the casing without damaging fluid-tightness/air-tightness. This necessity makes a manufacturer extremely careful in a design/manufacturing stage of the electric storage cell. In particular, in an electric storage cell of a vehicle used in a harsh environment, there are a lot of cases in which the number of necessary components or assembly processes excessively increases in order to ensure the fluid-tightness/air-tightness.

From the viewpoint of fluid-tightness/air-tightness of the electric storage cell, a technique of charging the electric storage cell in a contactless manner has been focused. JP2010-193657A discloses a mobile vehicle electricity feeding system configured to feed electric power to an electric storage apparatus of a vehicle in a contactless manner.

SUMMARY OF THE INVENTION

However, even in the contactless charging cell in related art such as that disclosed in JP2010-193657A, the electric storage element is charged/discharged using an electrode terminal penetrating the casing. Therefore, the fluid-tightness/air-tightness of the electric storage cell is still unsatisfactory. If the fluid-tightness/air-tightness of the electric storage cell is damaged, performance may be degraded due to electrolyte leakage or external air intrusion. This may influence on reliability and safety of the electric storage cell.

This invention has been designed in consideration of these problems, and an object thereof is to improve reliability and safety of an electric storage cell.

According to one aspect of this invention, an electric storage cell including a casing configured to house an electric storage element and electrolyte, a charging reception antenna connected to the electric storage element and configured to receive electric power transmitted from a power feeding unit in a contactless manner, and a discharging transmission antenna connected to the electric storage element and configured to transmit electric power stored in the electric storage element in a contactless manner is provided. The charging reception antenna and the discharging transmission antenna are arranged in the casing.

Embodiments of the present invention and advantages thereof are described in detail below with reference to the accompanying drawings.

EMBODIMENTS OF THE INVENTION

First Embodiment

Hereinafter, an electric double layer capacitor (hereinafter, simply referred to as a "capacitor") 100 serving as an electric storage cell according to a first embodiment of the present invention and an electric storage apparatus 101 having the capacitor 100 will be described with reference to FIGS. 1 to 5.

Figure 1A:
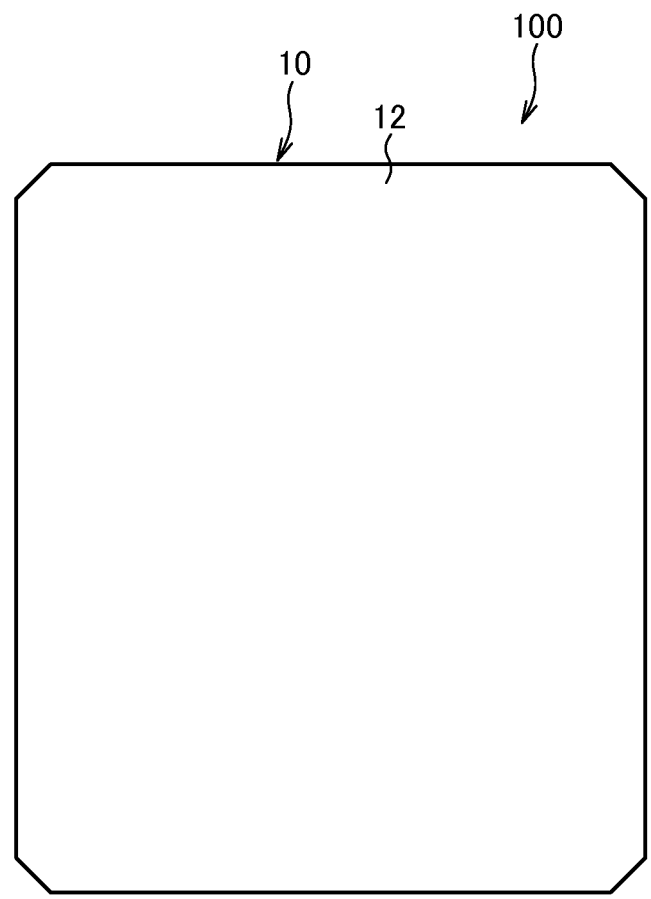
FIG. 1A is a front view illustrating an electric double layer capacitor according to a first embodiment of the present invention.
Figure 1B:
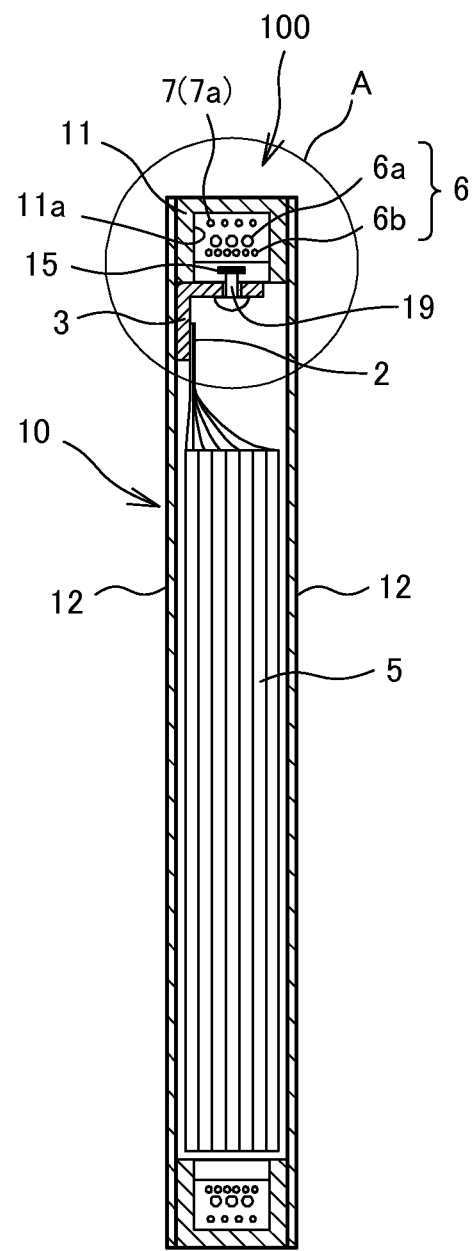
FIG. 1B is a cross-sectional view illustrating the electric double layer capacitor according to the first embodiment of the present invention.
Figure 1C:
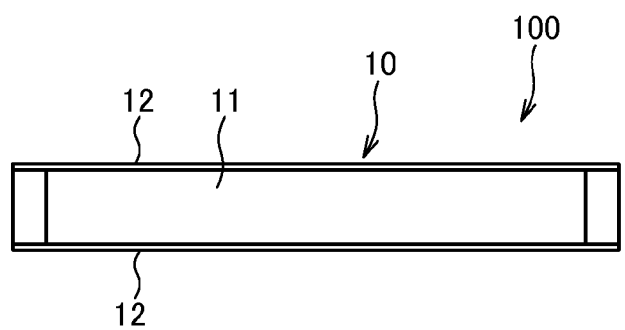
FIG. 1C is a plan view illustrating the electric double layer capacitor according to the first embodiment of the present invention.

As illustrated in FIG. 1, the capacitor 100 includes an electric storage element 5 configured to store electric charges, a casing 10 configured to house the electric storage element 5 and electrolyte; a charging reception antenna 6 connected to the electric storage element 5 and configured to receive electric power transmitted from a power feeding unit 20 (refer to FIG. 4) in a contactless manner, and a discharging transmission antenna 7 connected to the electric storage element 5 and configured to transmit electric power stored in the electric storage element 5 in a contactless manner.

Figure 3A:
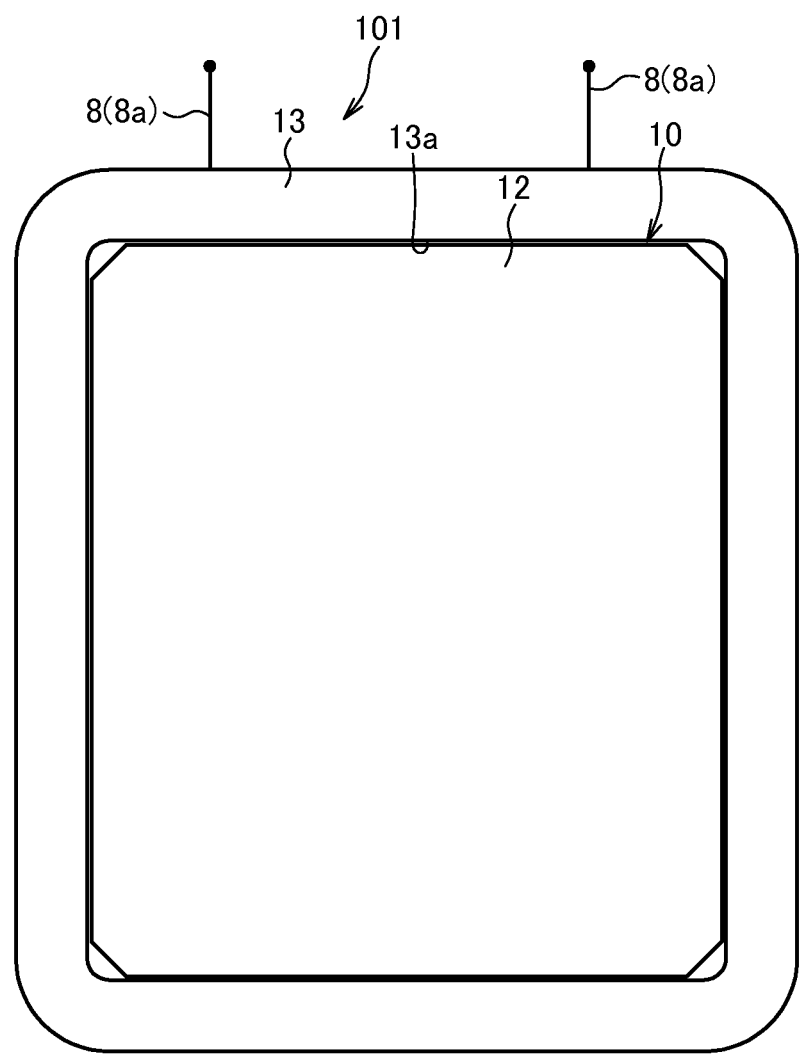
FIG. 3A is a front view illustrating an electric storage apparatus according to the first embodiment of the present invention.
Figure 3B:
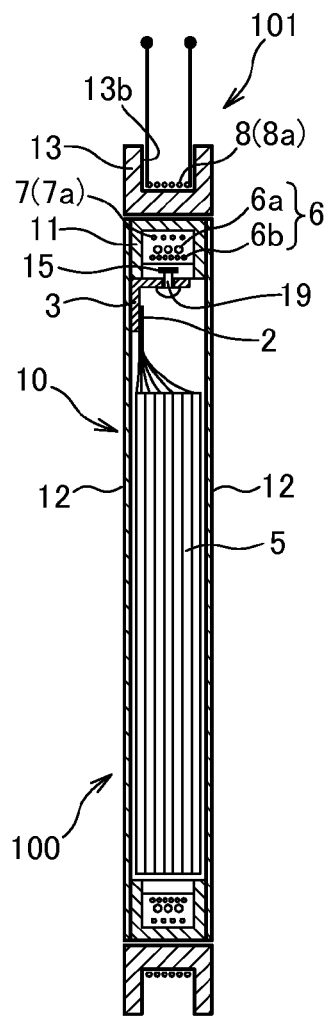
FIG. 3B is a cross-sectional view illustrating the electric storage apparatus according to the first embodiment of the present invention.
Figure 3C:
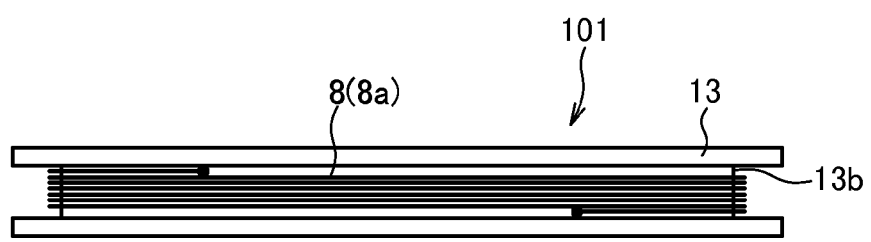
FIG. 3C is a plan view illustrating the electric storage apparatus according to the first embodiment of the present invention.

As illustrated in FIG. 3, the electric storage apparatus 101 includes a capacitor 100, a bobbin frame 13 configured to house the capacitor 100, and a discharging reception antenna 8 supported by the bobbin frame 13 and configured to receive the electric power transmitted from the discharging transmission antenna 7 in a contactless manner. The discharging reception antenna 8 is connected to a load 40 (refer to FIG. 4) that consumes the electric power charged in the capacitor 100. The load 40 is, for example, a motor or a secondary battery.

The electric storage element 5 is a layered product obtained by laminating a predetermined number of layers including a positive charge collector, a negative charge collector, and a separator interposed between the positive charge collector and the negative charge collector to separate both of them. Activated carbons constituting an electric double layer are coated on surfaces of the positive and negative charge collectors. A lead 2 is connected to each of the positive and negative charge collectors. The leads 2 of the charge collectors of the same polarity are bindingly connected to the electrode terminal 3 of the corresponding polarity.

The casing 10 includes a rectangular frame 11 as a rectangular frame-shaped member that surrounds the electric storage element 5 and a pair of film bodies 12 bonded to both surfaces of the rectangular frame 11. The rectangular frame 11 is made of resin, and the film body 12 is a laminate film. The laminate film is a multi-layered film material obtained by laminating a resin layer on a metal layer such as a metal foil. The rectangular frame 11 and the film body 12 are hermetically bonded by thermally welding each other's thermoplastic resin. As a result, the electrolyte is hermetically encapsulated in the casing 10.

The rectangular frame 11 has a trench 11a across the entire inner circumference. The charging reception antenna 6, the discharging transmission antenna 7, and a charge/discharge control circuit board 15 are fixed in the trench 11a using a mold material 16 such that the discharging transmission antenna 7 is arranged in the outside, and the charge/discharge control circuit board 15 is arranged in the inside. The mold material 16 is made of a material having excellent electric insulation and waterproof properties.

The charging reception antenna 6 includes a secondary self-resonance coil 6a and a secondary coil 6b. The secondary self-resonance coil 6a is an LC resonance coil having both ends opened. The secondary self-resonance coil 6a can be coupled with a primary self-resonance coil 23b of a power feeding unit 20 (refer to FIG. 4) by magnetic resonance. The secondary coil 6b can be coupled with the secondary self-resonance coil 6a by electromagnetic induction.

The discharging transmission antenna 7 includes a primary induction coil 7a, and the discharging reception antenna 8 includes a secondary induction coil 8a. The primary induction coil 7a can be coupled with the secondary induction coil 8a by electromagnetic induction.

Figure 2:
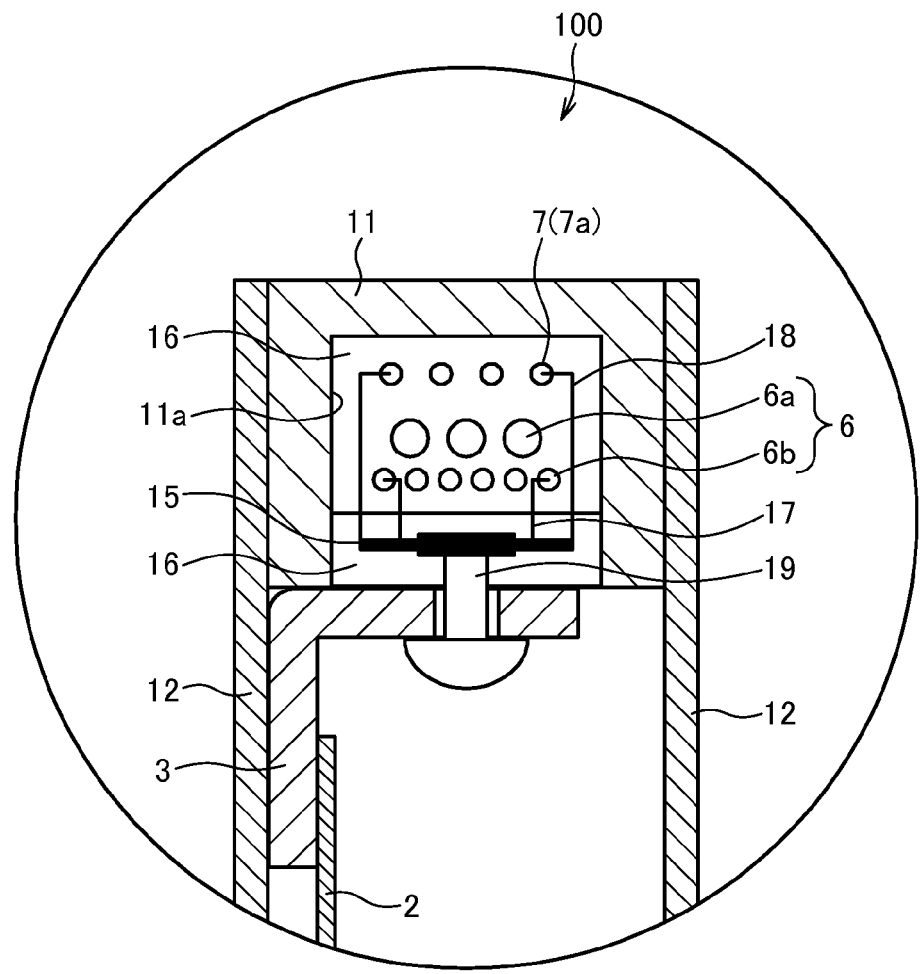
FIG. 2 is an enlarged view illustrating a portion A in FIG. 1B.

The charge/discharge control circuit board 15 has an electrically insulating board on which a charge/discharge control circuit that controls charge/discharge operation of the electric storage element 5 is provided. As illustrated in FIG. 2, both ends of the secondary coil 6b of the charging reception antenna 6 are connected to the charge/discharge control circuit board 15 through an interconnection 17, and both ends of the primary induction coil 7a are connected to the charge/discharge control circuit board 15 through an interconnection 18. In addition, positive and negative electrode terminals 3 are also connected to the charge/discharge control circuit board 15.

The electrode terminal 3 is made of a conductive metal such as aluminum and is formed in an L-shape. An outer surface of one side of the electrode terminal 3 extends in parallel with an inner surface of the film body 12, and an outer surface of the other side extends in parallel with an inner surface of the casing 10, that is, the mold material 16. The electrode terminal 3 is fixed to the casing 10 using a bolt 19 serving as a fastening member inserted into the mold material 16 through the other side thereof. The bolt 19 is made of a conductive metal such as aluminum, and the leading edge is connected to the charge/discharge control circuit board 15. In this manner, the electrode terminal 3 and the charge/discharge control circuit board 15 are electrically connected to each other using the bolt 19. The electrode terminal 3 and the charge/discharge control circuit board 15 may be electrically connected using an interconnection instead of the bolt 19.

As illustrated in FIG. 3, the secondary induction coil 8a is supported by the bobbin frame 13 which is a rectangular frame-shaped member. The bobbin frame 13 includes a rectangular inner circumferential surface 13a configured to house the casing 10, and a trench 13b is provided in an outer circumferential surface thereof. The secondary induction coil 8a is wound inside the trench 13b. Both ends of the secondary induction coil 8a are connected to the load 40 (refer to FIG. 4) that consumes electric power stored in the capacitor 100. The bobbin frame 13 is obtained by stacking ferrite or thin steel sheets. The bobbin frame 13 may be made of resin if the electric power transmission efficiency of the primary induction coil 7a and the secondary induction coil 8a is within an allowable range. In this case, it is possible to reduce a weight of the capacitor 100.

In this manner, the secondary induction coil 8a is arranged in the bobbin frame 13 separate from the casing 10. That is, while the primary induction coil 7a is arranged inside the casing 10, the secondary induction coil 8a is arranged outside the casing 10.

The capacitor 100 stores electric charges and discharges the stored electric charges using an electrostatic capacity of the electric double layer in both the positive and negative charge collectors of the electric storage element 5. The charge/discharge operation is performed using the charging reception antenna 6 and the discharging transmission antenna 7 in a contactless manner. For this reason, the capacitor 100 does not have an electrode terminal penetrating the casing 10, and only a bonding portion between the rectangular frame 11 and the film body 12 is a sealing portion of casing 10.

The electric storage apparatus 101 can be configured just by arranging the capacitor 100 in the bobbin frame 13 where the secondary induction coil 8a is wound.

Figure 4:
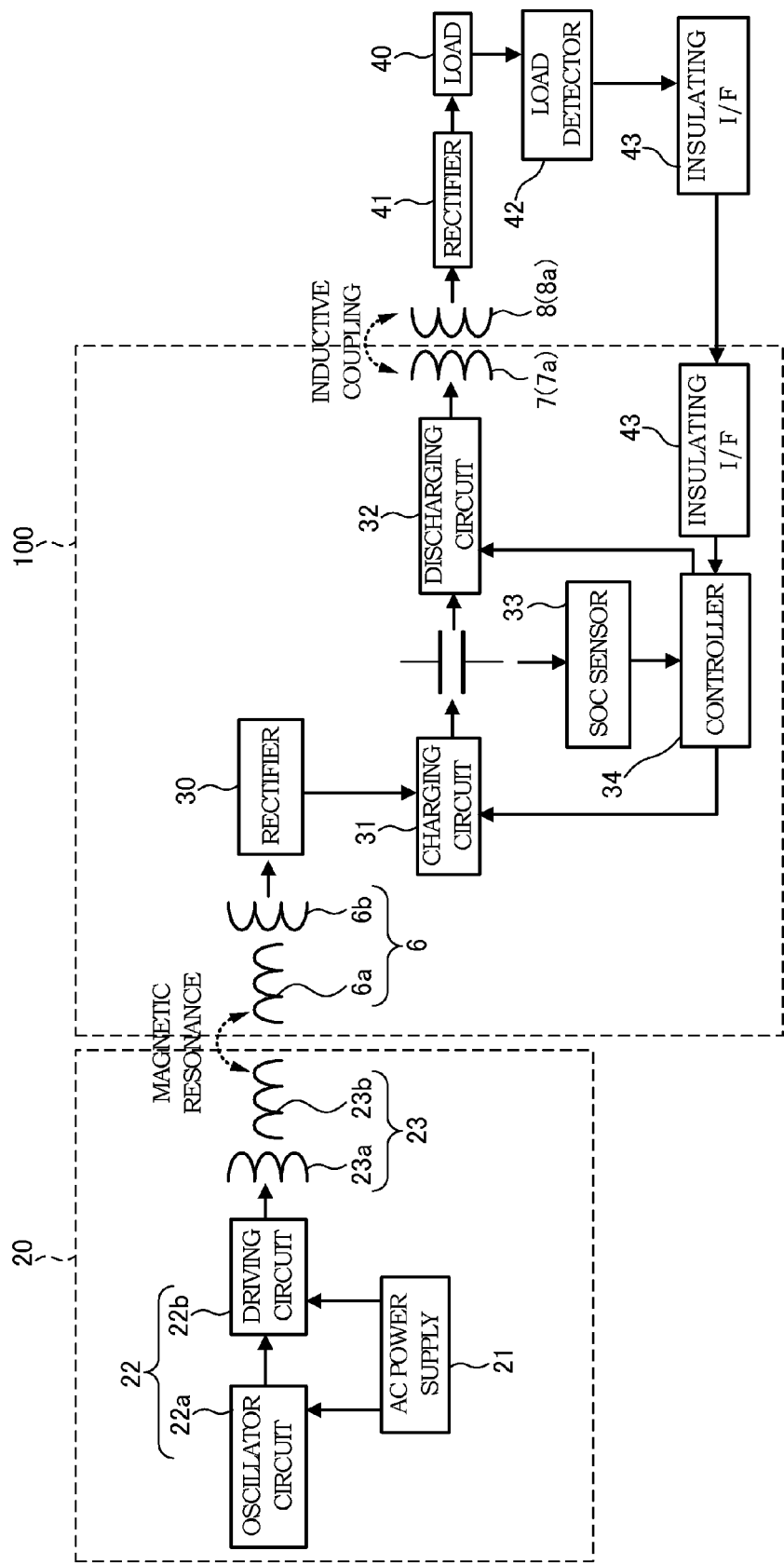
FIG. 4 is a block diagram illustrating a charge/discharge control circuit of the electric double layer capacitor according to the first embodiment of the present invention.

Next, a charge/discharge control circuit configured to control the charge/discharge operation of the electric storage element 5 will be described with reference to FIG. 4.

The charge/discharge control circuit includes a rectifier 30 configured to rectify the high-frequency electric power from the secondary coil 6b of the charging reception antenna 6 into a DC current, a charging circuit 31 configured to charge electric power in the electric storage element 5, a discharging circuit 32 configured to discharge electric power from the electric storage element 5 to the primary induction coil 7a, an state of charge (SOC) sensor 33 configured to detect an electric charge amount of the electric storage element 5, and a controller 34 configured to control the charging circuit 31 and the discharging circuit 32.

The controller 34 includes a microcomputer having a central processing unit (CPU), a read-only memory (ROM), a random access memory (RAM), and an input/output interface (I/O interface). The controller 34 also includes an electric control element. The controller 34 may include a plurality of analog elements.

The power feeding unit 20 includes an AC power supply 21, an electric power transformer unit 22 configured to transform the electric power of the AC power supply 21 into transmittable electric power, and a charging transmission antenna 23 configured to transmit the electric power supplied from the electric power transformer unit 22 to the charging reception antenna 6 of the capacitor 100 in a contactless manner.

The AC power supply 21 is, for example, a system power supply. The electric power transformer unit 22 includes an oscillator circuit 22a configured to generate a predetermined high frequency and a driving circuit 22b configured to transform the output power of the AC power supply 21 to the high-frequency power of the oscillator circuit 22a and output the high-frequency power to the charging transmission antenna 23.

The charging transmission antenna 23 includes a primary coil 23a and a primary self-resonance coil 23b that can be coupled to the primary coil 23a by electromagnetic induction. The primary coil 23a transmits the electric power received from the driving circuit 22b to the primary self-resonance coil 23b by electromagnetic induction. The primary self-resonance coil 23b is an LC resonance coil having both ends opened.

As the power feeding unit 20 is operated, the primary self-resonance coil 23b of the charging transmission antenna 23 and the secondary self-resonance coil 6a of the charging reception antenna 6 of the capacitor 100 are coupled to each other by magnetic resonance, so that electric power is transmitted from the charging transmission antenna 23 to the charging reception antenna 6. In the capacitor 100, the high-frequency power received by the charging reception antenna 6 is transformed to the DC power using the rectifier 30, and the electric storage element 5 is charged using the charging circuit 31. In this case, the controller 34 controls the charging circuit 31 such that the electric storage element 5 is not overcharged based on a charging amount signal from the SOC sensor 33 configured to detect an electric charge amount of the electric storage element 5.

In a case where the electric power stored in the electric storage element 5 is supplied to the load 40, the primary induction coil 7a of the capacitor 100 and the secondary induction coil 8a of the electric storage apparatus 101 are coupled to each other by electromagnetic induction, and the electric power stored in the electric storage element 5 is transmitted from the primary induction coil 7a to the secondary induction coil 8a using the discharging circuit 32. The high-frequency power received by the secondary induction coil 8a is transformed to the DC power using the rectifier 41 and is supplied to the load 40.

Here, in a case where the load 40 is not connected to the capacitor 100, the electric power stored in the electric storage element 5 may be wastefully consumed if the discharging circuit 32 does not stop. In this regard, a load detector 42 configured to detect the load state of the load 40 is connected to the load 40. The detection result of the load detector 42 is output to the controller 34 through an insulating interface 43. The controller 34 determines the load state of the load 40 based on the detection result of the load detector 42 and controls the operation of the discharging circuit 32. Therefore, in a case where the load 40 is not connected to the capacitor 100, the load detector 42 detects a loadless state of the load 40, and the controller 34 performs control such that the discharging circuit 32 stops. Therefore, it is possible to prevent wasteful power consumption.

The insulating interface 43 electrically insulates the load detector 42 and the controller 34 and allows for transmission of the detection signal from the load detector 42 to the controller 34.

Alternatively, instead of the load detector 42, the primary induction coil 7a of the capacitor 100 may be used as a load detector. In this case, the controller 34 determines the load state of the load 40 based on a voltage or current of the primary induction coil 7a and controls the operation of the discharging circuit 32. In this configuration, it is possible to eliminate the insulating interface 43 and the load detector 42 connected to the load 40 and to simplify a structure.

Figure 5:
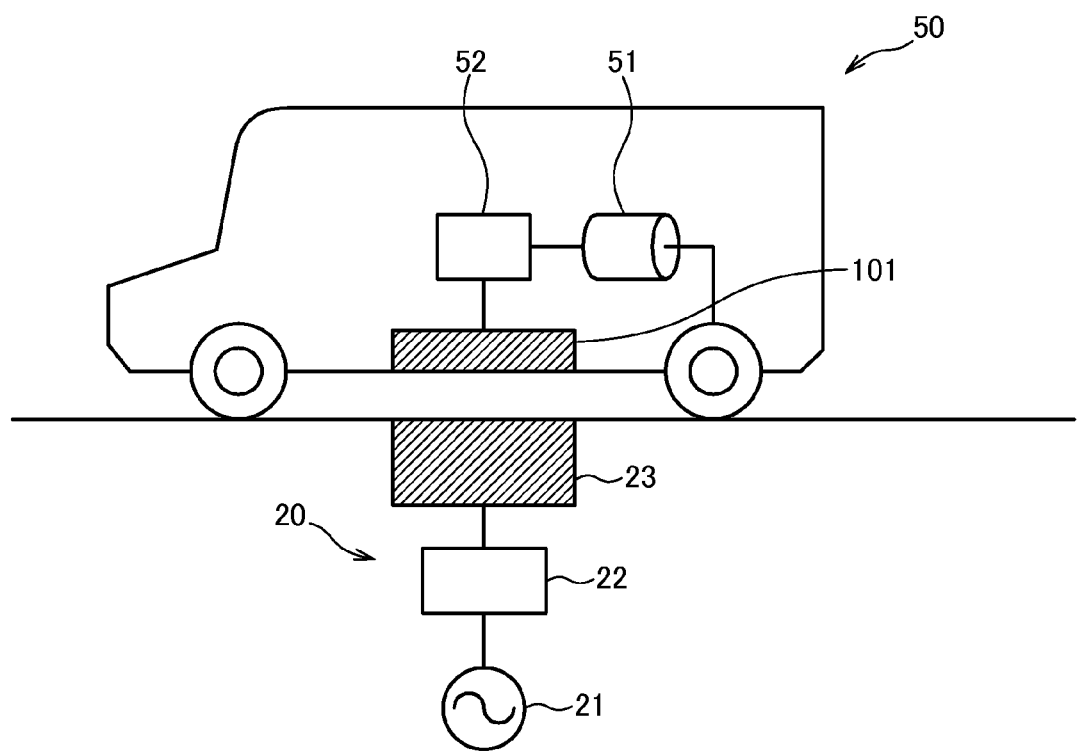
FIG. 5 is a schematic diagram illustrating a case where the electric storage apparatus according to the first embodiment of the present invention is applied to a vehicle.

Next, a use example of the electric storage apparatus 101 in a case where the electric storage apparatus 101 is applied to a vehicle 50 will be described with reference to FIG. 5.

The vehicle 50 includes a motor 51 connected to a drive wheel, a secondary battery 52 as a power source of the motor 51, and the electric storage apparatus 101 as a subsidiary power supply that supplies electric power to the secondary battery 52. In this example, the secondary battery 52 corresponds to the load 40 of FIG. 4.

For example, in a case where the electric charge amount of the secondary battery 52 is reduced, the vehicle 50 stops at a power feeding location such that the electric storage apparatus 101 faces the power feeding unit 20 to operate the power feeding unit 20. As a result, the primary self-resonance coil 23b of the charging transmission antenna 23 and the secondary self-resonance coil 6a of the charging reception antenna 6 of the capacitor 100 are coupled to each other by magnetic resonance, and electric power is supplied from the AC power supply 21 to the capacitor 100 in a contactless manner to rapidly charge the capacitor 100.

After the capacitor 100 is completely charged, electric power is supplied from the capacitor 100 to the secondary battery 52 in a contactless manner while the vehicle 50 travels, so that the secondary battery 52 is charged for a relatively long time.

In this manner, in a case where the electric charge amount of the secondary battery 52 as a driving source of the vehicle 50 is reduced, the electric storage apparatus 101 as a subsidiary power supply is rapidly charged using the power feeding unit 20, and the secondary battery 52 is then charged using the electric storage apparatus 101.

As an alternative use example of the electric storage apparatus 101, the electric storage apparatus 101 may be used as a power source of the motor 51. In this case, while the vehicle 50 brakes, the motor 51 is driven as a generator using a rotational torque of the drive wheel to perform regenerative power generation, so that the resulting regenerative power is charged in the capacitor 100. In this example, the motor 51 corresponds to the power feeding unit 20 and the load 40 of FIG. 4.

The electric storage apparatus 101 is not limited to a vehicle-mounted product. The electric storage apparatus 101 performs the charge/discharge operation in a contactless manner so that a charge/discharge electric current is relatively weak. Therefore, the electric storage apparatus 101 may be suitably employed if even a weak charge/discharge electric current is sufficiently used. For example, the electric storage apparatus 101 may be employed in a power supply or a subsidiary power supply of an electronic apparatus.

According to the first embodiment, it is possible to obtain the following effects.

The electric storage element 5 is charged/discharged in a contactless manner using the charging reception antenna 6 and the discharging transmission antenna 7 arranged in the casing 10, so that the electrode terminal 3 does not penetrate the casing 10. Therefore, it is possible to prevent electrolyte from leaking from the casing 10 or gas from intruding into the casing 10 from the outside. Accordingly, it is possible to improve reliability and safety of the capacitor 100.

Since the electrode terminal 3 does not penetrate the casing 10, it is possible to obtain a compact module by stacking a plurality of capacitors 100.

Furthermore, since the electrode terminal 3 does not penetrate the casing 10, it is possible to easily ensure insulation and remove a possibility of an electric shock in maintenance of the capacitor 100 and the electric storage apparatus 101.

Since electric connection between capacitors 100 is not necessary even when a plurality of capacitors 100 are laminated, it is possible to facilitate an assembly process.

In the electric storage apparatus 101, the capacitor 100 is housed in the bobbin frame 13. Therefore, it is possible to exchange the capacitor 100 in a simple and easy manner. For example, in a case where a failure occurs in the capacitor 100, the failed capacitor 100 housed in the bobbin frame 13 may be extracted and replaced with another capacitor 100 just by inserting the new capacitor 100 without necessity of removing or installing electric wiring. Even in a case where a short-circuit occurs in the secondary induction coil 8a wound in the bobbin frame 13, there is no influence on the capacitor 100.

Hereinafter, a modification of the first embodiment described above will be described.

Figure 6:
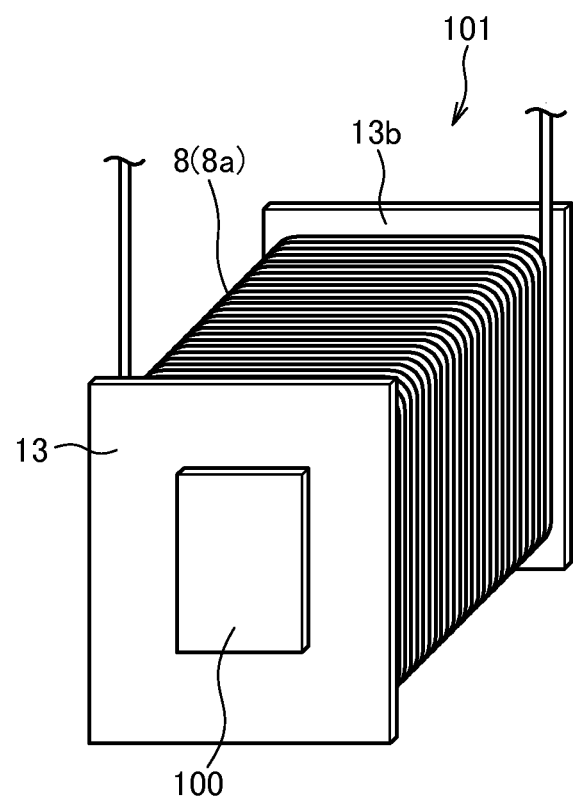
FIG. 6 is a perspective view illustrating a modification of the electric double layer capacitor according to the first embodiment of the present invention.

(1) In a case where a module is configured by stacking a plurality of capacitors 100, a plurality of capacitors 100 may be housed in a single bobbin frame 13 as illustrated in FIG. 6. That is, a single common bobbin frame 13 may be used for a plurality of capacitors 100. In this case, the bobbin frame 13 is formed to extend in a thickness direction of the capacitor 100, and a single secondary induction coil 8a is wound in the outer circumference of the bobbin frame 13. In this manner, the secondary induction coil 8a is also commonly used for a plurality of capacitors 100.

Figure 7A:
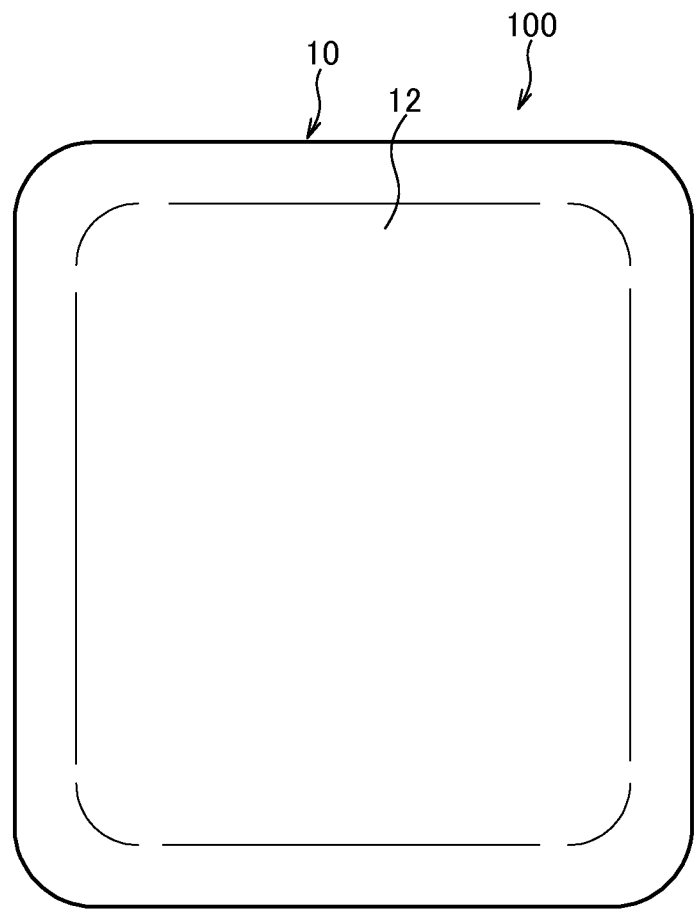
FIG. 7A is a front view illustrating a modification of the electric double layer capacitor according to the first embodiment of the present invention.
Figure 7B:
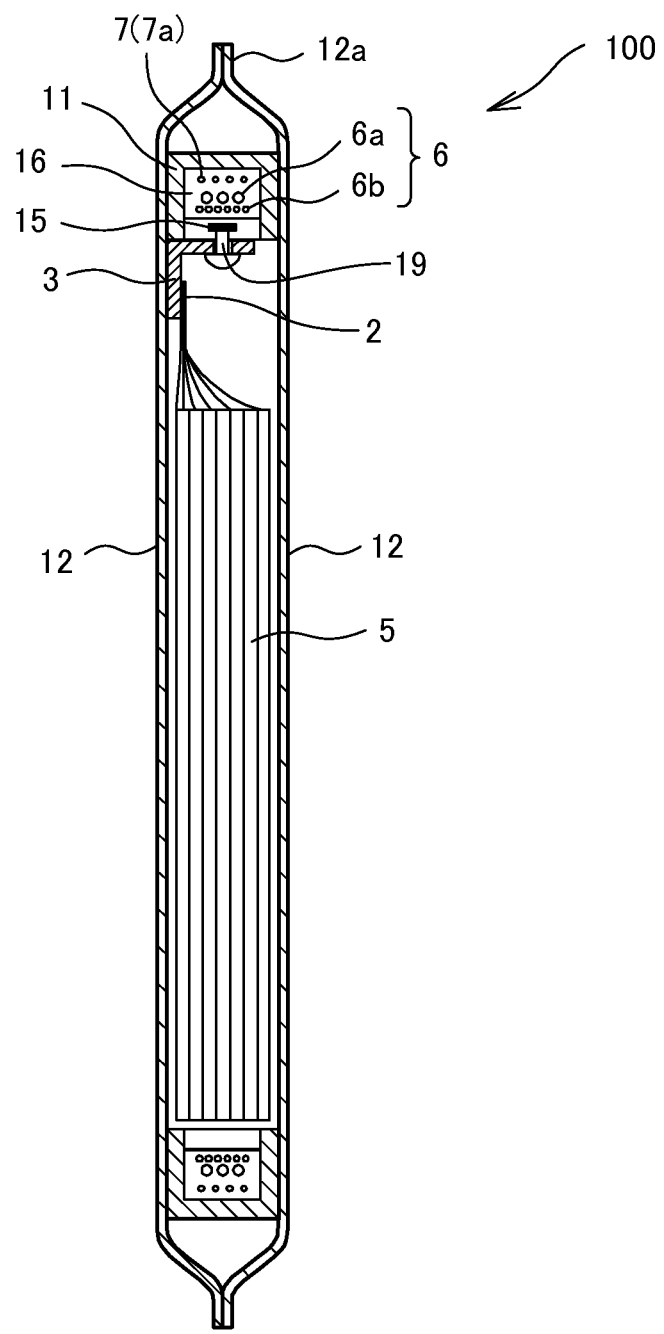
FIG. 7B is a cross-sectional view illustrating a modification of the electric double layer capacitor according to the first embodiment of the present invention.

(2) Instead of bonding the film body 12 to both surfaces of the rectangular frame 11, a pair of film bodies 12 may face each other, and outer edge portions thereof may be bonded to each other as illustrated in FIG. 7. In this case, the rectangular frame 11 is housed in the film body 12. In order to house the capacitor 100 in the bobbin frame 13, the outer circumferential bonding portion 12a of the film body 12 is bent.

(3) Although the first embodiment described above relates to a case where the electric storage cell is a capacitor, the electric storage cell may include other types of electric storage cells such as a nickel hydrogen battery or a lithium ion battery.

(4) In the first embodiment, a magnetic resonance type transmission method is employed in coupling between the charging transmission antenna 23 and the charging reception antenna 6, and an electromagnetic induction type transmission method is employed in coupling between the discharging transmission antenna 7 and the discharging reception antenna 8. However, a contactless transmission method is not limited thereto. Alternatively, an electromagnetic induction type transmission method may be employed in coupling between the charging transmission antenna 23 and the charging reception antenna 6, and a magnetic resonance type transmission method may be employed in coupling between the discharging transmission antenna 7 and the discharging reception antenna 8. Alternatively, other transmission methods such as microwaves may be employed.

Second Embodiment

Figure 8A:
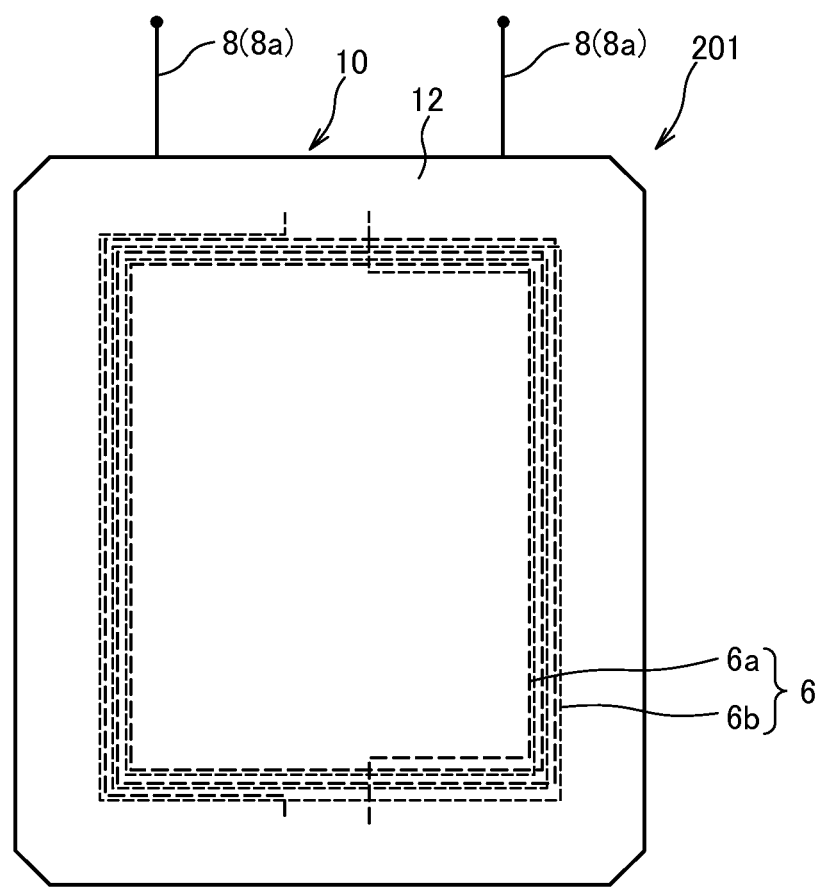
FIG. 8A is a front view illustrating an electric double layer capacitor according to a second embodiment of the present invention.
Figure 8B:
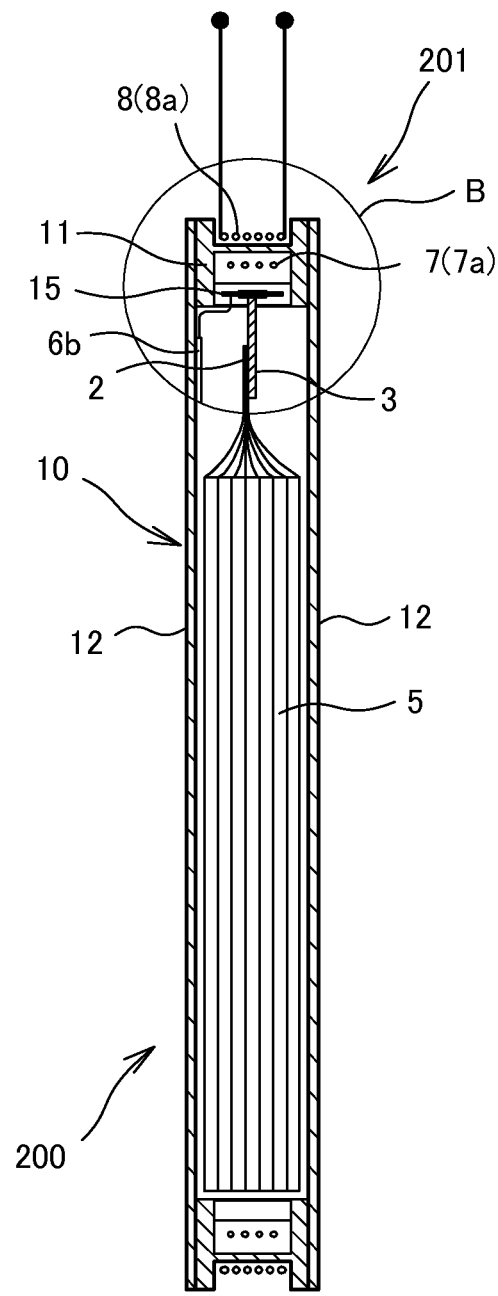
FIG. 8B is a cross-sectional view illustrating the electric double layer capacitor according to the second embodiment of the present invention.
Figure 8C:
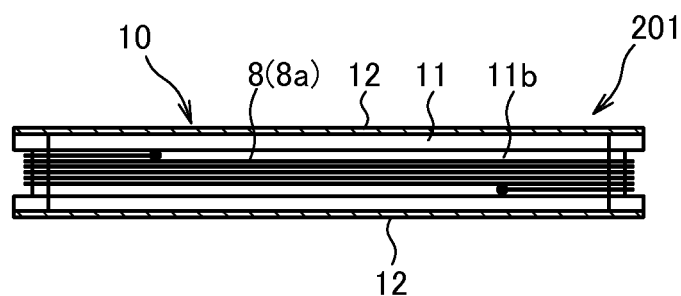
FIG. 8C is a plan view illustrating the electric double layer capacitor according to the second embodiment of the present invention.
Figure 9:
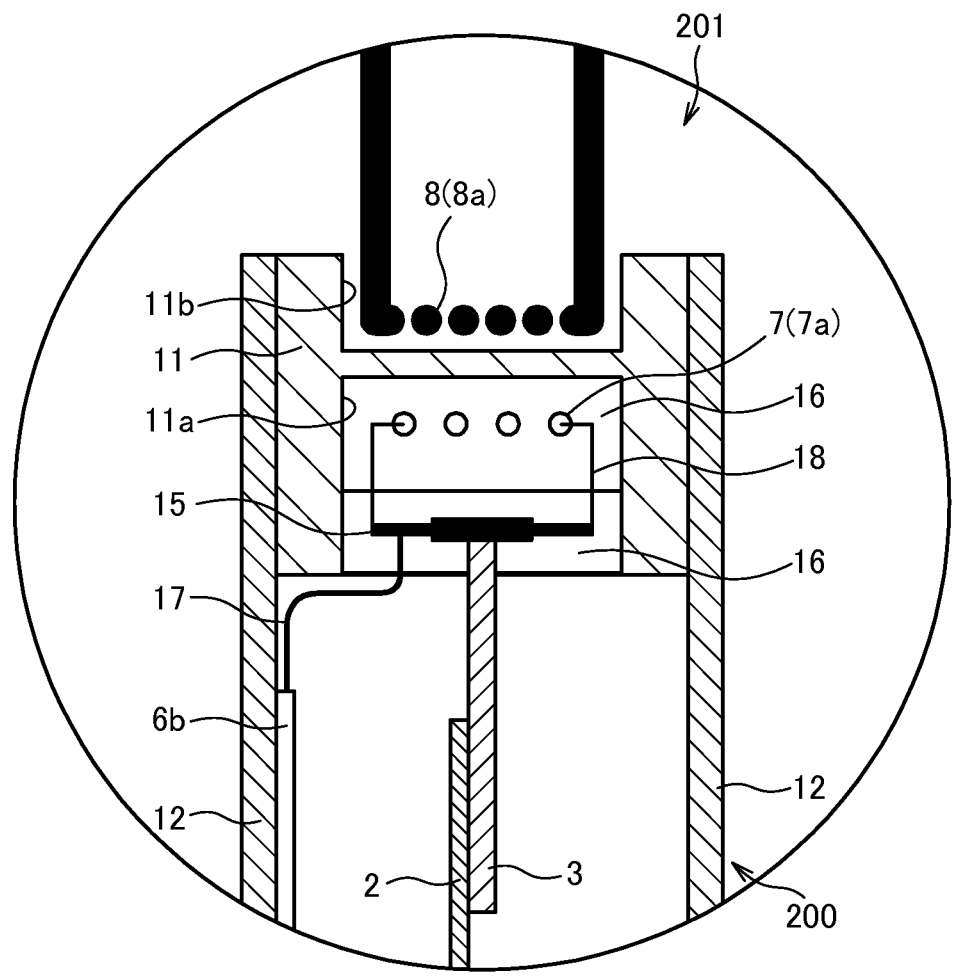
FIG. 9 is an enlarged view illustrating a portion B of FIG. 8B.

Hereinafter, a capacitor 200 according to a second embodiment of the present invention and an electric storage apparatus 201 having the capacitor 200 will be described with reference to FIGS. 8 and 9. The following description will be made by focusing on differences from the capacitor 100 and the electric storage apparatus 101 according to the first embodiment, and identical configurations to the capacitor 100 and the electric storage apparatus 101 have been allocated identical reference symbols in the drawings, and description thereof has been omitted.

In the capacitor 200, the rectangular frame 11 of the casing 10 has a trench 11a in the entire inner circumference and also a trench 11b in the entire outer circumference. Similar to the capacitor 100 according to the first embodiment, the discharging transmission antenna 7 and the charge/discharge control circuit board 15 are fixed in the trench 11a using the mold material 16. However, the secondary coil 6b and the secondary self-resonance coil 6a of the charging reception antenna 6 are incorporated into the film body 12.

Specifically, the secondary self-resonance coil 6a and the secondary coil 6b are formed by printing a pattern on an electrically insulative film in advance. The electrically insulative film where the secondary self-resonance coil 6a is formed is inserted between a pair of resin layers of the laminate film of the film body 12 in advance. The electrically insulative film where the secondary coil 6b is formed is inserted between another pair of resin layers of the laminate film in advance.

To the charge/discharge control circuit board 15, both ends of the secondary coil 6b of the charging reception antenna 6 are connected using the interconnection 17, and both ends of the primary induction coil 7a are connected using the interconnection 18. In addition, the positive and negative electrode terminals 3 are also connected to the charge/discharge control circuit board 15.

The electrode terminal 3 is formed in a sheet shape. One end of the electrode terminal 3 is connected to the lead 2 of the charge collector having a corresponding polarity, and the other end is inserted into the mold material 16 and is directly connected to the charge/discharge control circuit board 15. In this manner, according to the present embodiment, the electrode terminal 3 and the charge/discharge control circuit board 15 are directly and electrically connected to each other.

The electric storage apparatus 201 does not have the bobbin frame 13, and the secondary induction coil 8a is supported by the outer circumference of the casing 10. Specifically, the secondary induction coil 8a is wound in the trench 11b formed in the outer circumference of the rectangular frame 11.

In this manner, the primary induction coil 7a is arranged inside the trench 11a formed in the inner circumference of the rectangular frame 11, and the secondary induction coil 8a is arranged inside the trench 11b formed in the outer circumference of the rectangular frame 11. In this manner, the electric storage apparatus 201 is configured as an integrated apparatus unlike the electric storage apparatus 101 according to the first embodiment. Therefore, it is difficult to remove the capacitor 200 from the electric storage apparatus 201. This means that it is possible to compactly configure the electric storage apparatus 201, compared to the electric storage apparatus 101 according to the first embodiment.

The arrangement of the charging reception antenna 6 and the discharging transmission antenna 7 are not limited to those described in the first and second embodiment.

Alternatively, the charging reception antenna 6 may be fixed in the trench 11a of the rectangular frame 11 using the mold material 16, and the discharging transmission antenna 7 may be incorporated into the film body 12.

Both the charging reception antenna 6 and the discharging transmission antenna 7 may be incorporated into the film body 12. In this case, only the charge/discharge control circuit board 15 is arranged in the trench 11a of the rectangular frame 11.

Embodiments of this invention were described above, but the above embodiments are merely examples of applications of this invention, and the technical scope of this invention is not limited to the specific constitutions of the above embodiments.

This application claims priority based on Japanese Patent Application No. 2010-276701 filed with the Japan Patent Office on Dec. 13, 2010, the entire contents of which are incorporated into this specification.

The invention claimed is:

1. An electric storage cell, comprising:
 a casing configured to house an electric storage element and electrolyte;
 a charging reception antenna connected to the electric storage element and configured to receive electric power transmitted from a power feeding unit in a contactless manner; and
 a discharging transmission antenna connected to the electric storage element and configured to transmit electric power stored in the electric storage element in a contactless manner,
 wherein
 the charging reception antenna and the discharging transmission antenna are arranged in the casing,
 the casing has a frame having a trench in an inner circumference to surround the electric storage element and a film body bonded to both surfaces of the frame, and
 the charging reception antenna and the discharging transmission antenna are arranged in the trench and are fixed using a mold material.

2. The electric storage cell according to claim 1, further comprising:
 an electrode terminal connected to a charge collector of the electric storage element; and
 a charge/discharge control circuit board having a charge/discharge control circuit provided on an electrically insulative board to control charge/discharge operation of the electric storage element,
 wherein the charge/discharge control circuit board is arranged in the trench and is fixed using the mold material, and
 the charging reception antenna, the discharging transmission antenna, and the electrode terminal are connected to the charge/discharge control circuit board.

3. The electric storage cell according to claim 2, further comprising a conductive fastening member configured to fix the electrode terminal to the mold material,
 wherein the charge/discharge control circuit board and the electrode terminal are electrically connected to each other through the fastening member.

4. An electric storage apparatus comprising:
 the electric storage cell according to claim 2;
 a discharging reception antenna configured to receive electric power transmitted from the discharging transmission antenna in a contactless manner; and
 a load detector configured to detect a load state of a load connected to the discharging reception antenna,
 wherein the charge/discharge control circuit determines the load state of the load based on a detection result of the load detector and controls discharge operation from the electric storage element to the discharging transmission antenna.

5. The electric storage apparatus according to claim 4, wherein the detection result of the load detector is output to the charge/discharge control circuit through an insulating interface.

6. The electric storage apparatus according to claim 4, wherein the discharging transmission antenna is used as the load detector, and
 the charge/discharge control circuit determines the load state of the load based on a voltage or current of the discharging transmission antenna and controls discharge operation from the electric storage element to the discharging transmission antenna.

7. An electric storage cell, comprising:
 a casing configured to house an electric storage element and electrolyte;
 a charging reception antenna connected to the electric storage element and configured to receive electric power transmitted from a power feeding unit in a contactless manner; and
 a discharging transmission antenna connected to the electric storage element and configured to transmit electric power stored in the electric storage element in a contactless manner,
 wherein
 the charging reception antenna and the discharging transmission antenna are arranged in the casing,
 the casing has a frame having a trench in an inner circumference to surround the electric storage element and a film body bonded to both surfaces of the frame,
 the charging reception antenna is incorporated into the film body, and
 the discharging transmission antenna is arranged in the trench and is fixed using a mold material.

8. The electric storage cell according to claim 7, further comprising:
 an electrode terminal connected to a charge collector of the electric storage element; and
 a charge/discharge control circuit board having a charge/discharge control circuit provided on an electrically insulative board to control charge/discharge operation of the electric storage element,
 wherein the charge/discharge control circuit board is arranged in the trench and is fixed using the mold material, and
 the charging reception antenna, the discharging transmission antenna, and the electrode terminal are connected to the charge/discharge control circuit board.

9. The electric storage cell according to claim 8, further comprising a conductive fastening member configured to fix the electrode terminal to the mold material,
 wherein the charge/discharge control circuit board and the electrode terminal are electrically connected to each other through the fastening member.

10. An electric storage apparatus comprising:
 the electric storage cell according to claim 8;
 a discharging reception antenna configured to receive electric power transmitted from the discharging transmission antenna in a contactless manner; and
 a load detector configured to detect a load state of a load connected to the discharging reception antenna,
 wherein the charge/discharge control circuit determines the load state of the load based on a detection result of the load detector and controls discharge operation from the electric storage element to the discharging transmission antenna.

11. The electric storage apparatus according to claim 10, wherein the detection result of the load detector is output to the charge/discharge control circuit through an insulating interface.

12. The electric storage apparatus according to claim 10, wherein the discharging transmission antenna is used as the load detector, and
the charge/discharge control circuit determines the load state of the load based on a voltage or current of the discharging transmission antenna and controls discharge operation from the electric storage element to the discharging transmission antenna.

13. An electric storage apparatus comprising:
the electric storage cell according to claim 7; and
a discharging reception antenna configured to receive electric power transmitted from the discharging transmission antenna in a contactless manner,
wherein the discharging reception antenna is arranged outside the casing.

14. The electric storage apparatus according to claim 13, further comprising a bobbin frame that supports the discharging reception antenna,
wherein the electric storage cell is housed in the bobbin frame.

15. The electric storage apparatus according to claim 14, wherein a plurality of the electric storage cells are housed in the single bobbin frame in a layered manner.

16. The electric storage apparatus according to claim 13, wherein the discharging reception antenna is supported by an outer circumference of the casing.

17. An electric storage cell, comprising:
a casing configured to house an electric storage element and electrolyte;
a charging reception antenna connected to the electric storage element and configured to receive electric power transmitted from a power feeding unit in a contactless manner; and
a discharging transmission antenna connected to the electric storage element and configured to transmit electric power stored in the electric storage element in a contactless manner,
wherein
the charging reception antenna and the discharging transmission antenna are arranged in the casing,
the casing has a frame having a trench in an inner circumference to surround the electric storage element and a film body bonded to both surfaces of the frame,
the charging reception antenna is arranged in the trench and is fixed using a mold material, and
the discharging transmission antenna is incorporated into the film body.

18. The electric storage cell according to claim 17, further comprising:
an electrode terminal connected to a charge collector of the electric storage element; and
a charge/discharge control circuit board having a charge/discharge control circuit provided on an electrically insulative board to control charge/discharge operation of the electric storage element,
wherein the charge/discharge control circuit board is arranged in the trench and is fixed using the mold material, and
the charging reception antenna, the discharging transmission antenna, and the electrode terminal are connected to the charge/discharge control circuit board.

19. The electric storage cell according to claim 18, further comprising a conductive fastening member configured to fix the electrode terminal to the mold material,
wherein the charge/discharge control circuit board and the electrode terminal are electrically connected to each other through the fastening member.

20. An electric storage apparatus comprising:
the electric storage cell according to claim 18;
a discharging reception antenna configured to receive electric power transmitted from the discharging transmission antenna in a contactless manner; and
a load detector configured to detect a load state of a load connected to the discharging reception antenna,
wherein the charge/discharge control circuit determines the load state of the load based on a detection result of the load detector and controls discharge operation from the electric storage element to the discharging transmission antenna.

21. The electric storage apparatus according to claim 20, wherein the detection result of the load detector is output to the charge/discharge control circuit through an insulating interface.

22. The electric storage apparatus according to claim 20, wherein the discharging transmission antenna is used as the load detector, and
the charge/discharge control circuit determines the load state of the load based on a voltage or current of the discharging transmission antenna and controls discharge operation from the electric storage element to the discharging transmission antenna.

23. An electric storage cell, comprising:
a casing configured to house an electric storage element and electrolyte;
a charging reception antenna connected to the electric storage element and configured to receive electric power transmitted from a power feeding unit in a contactless manner; and
a discharging transmission antenna connected to the electric storage element and configured to transmit electric power stored in the electric storage element in a contactless manner,
wherein
the charging reception antenna and the discharging transmission antenna are arranged in the casing,
the casing has a frame having a trench in an inner circumference to surround the electric storage element and a film body bonded to both surfaces of the frame, and
the charging reception antenna and the discharging transmission antenna are incorporated into the film body.

24. The electric storage cell according to claim 23, further comprising:
an electrode terminal connected to a charge collector of the electric storage element; and
a charge/discharge control circuit board having a charge/discharge control circuit provided on an electrically insulative board to control charge/discharge operation of the electric storage element,
wherein the charge/discharge control circuit board is arranged in the trench and is fixed using a mold material, and
the charging reception antenna, the discharging transmission antenna, and the electrode terminal are connected to the charge/discharge control circuit board.

25. The electric storage cell according to claim 24, further comprising a conductive fastening member configured to fix the electrode terminal to the mold material,
wherein the charge/discharge control circuit board and the electrode terminal are electrically connected to each other through the fastening member.

26. An electric storage apparatus comprising:
the electric storage cell according to claim 24;
a discharging reception antenna configured to receive electric power transmitted from the discharging transmission antenna in a contactless manner; and
a load detector configured to detect a load state of a load connected to the discharging reception antenna,
wherein the charge/discharge control circuit determines the load state of the load based on a detection result of the load detector and controls discharge operation from the electric storage element to the discharging transmission antenna.

27. The electric storage apparatus according to claim 26, wherein the detection result of the load detector is output to the charge/discharge control circuit through an insulating interface.

28. The electric storage apparatus according to claim 26, wherein the discharging transmission antenna is used as the load detector, and
the charge/discharge control circuit determines the load state of the load based on a voltage or current of the discharging transmission antenna and controls discharge operation from the electric storage element to the discharging transmission antenna.

* * * * *